(12) United States Patent
Loudot et al.

(10) Patent No.: US 7,643,914 B2
(45) Date of Patent: Jan. 5, 2010

(54) METHOD FOR CONTROLLING THE OPERATION AND CONTINUOUS CURRENT MODE OF A DRIVE ASSEMBLY FOR A MOTOR VEHICLE PROVIDED WITH AN INTERNAL COMBUSTION ENGINE

(75) Inventors: Serge Loudot, Villiers le Bacle (FR); Armando Fonseca, Voisins le Bretonneux (FR)

(73) Assignee: Renault S.A.S., Boulogne Billancourt (FR)

( * ) Notice: Subject to any disclaimer, the term of this patent is extended or adjusted under 35 U.S.C. 154(b) by 116 days.

(21) Appl. No.: 11/720,482

(22) PCT Filed: Oct. 27, 2005

(86) PCT No.: PCT/FR2005/050908
§ 371 (c)(1),
(2), (4) Date: May 30, 2007

(87) PCT Pub. No.: WO2006/059023
PCT Pub. Date: Jun. 8, 2006

(65) Prior Publication Data
US 2008/0167769 A1    Jul. 10, 2008

(30) Foreign Application Priority Data
Nov. 30, 2004    (FR)    ................... 04 12668

(51) Int. Cl.
G05D 3/00 (2006.01)
H02P 23/00 (2006.01)
(52) U.S. Cl. ........................ 701/22; 318/701

(58) Field of Classification Search ................. 318/700, 318/701; 701/22
See application file for complete search history.

(56) References Cited

U.S. PATENT DOCUMENTS

| 3,936,726 | A | * | 2/1976 | Kelley, Jr. ................... 323/237 |
| 5,469,039 | A | * | 11/1995 | Stephenson et al. ......... 318/701 |
| 2002/0101221 | A1 | * | 8/2002 | Stefanovic et al. ............ 322/24 |
| 2002/0113615 | A1 | * | 8/2002 | Atarashi ..................... 324/772 |
| 2003/0020436 | A1 | | 1/2003 | Coles et al. |
| 2004/0178774 | A1 | * | 9/2004 | Randall et al. ................ 322/23 |

FOREIGN PATENT DOCUMENTS

| EP | 0 534 761 | 3/1993 |
| EP | 1 109 308 | 6/2001 |

OTHER PUBLICATIONS

Inderka et al., "Ditc-Direct Instantaneous Torque Control of Switched Reluctance Drives", Conference Record of the 2002 IEEE Industry Applications Conference, vol. 1 of 4. Conf. 37, pp. 1605-1609, XP010610094, 2002.
U.S. Appl. No. 11/720,492, filed May 30, 2007, Loudot.

* cited by examiner

Primary Examiner—Mark Hellner
Assistant Examiner—Helal A Algahaim
(74) Attorney, Agent, or Firm—Oblon, Spivak, McClelland, Maier & Neustadt, L.L.P.

(57) ABSTRACT

A method for controlling a drive assembly of a vehicle including applying a conduction angle set value greater than 180° to a variable reluctance machine such that the machine operates in a continuous current mode adjustable according to the controlled measurement of operation stability of the machine in the continuous current mode.

19 Claims, 11 Drawing Sheets

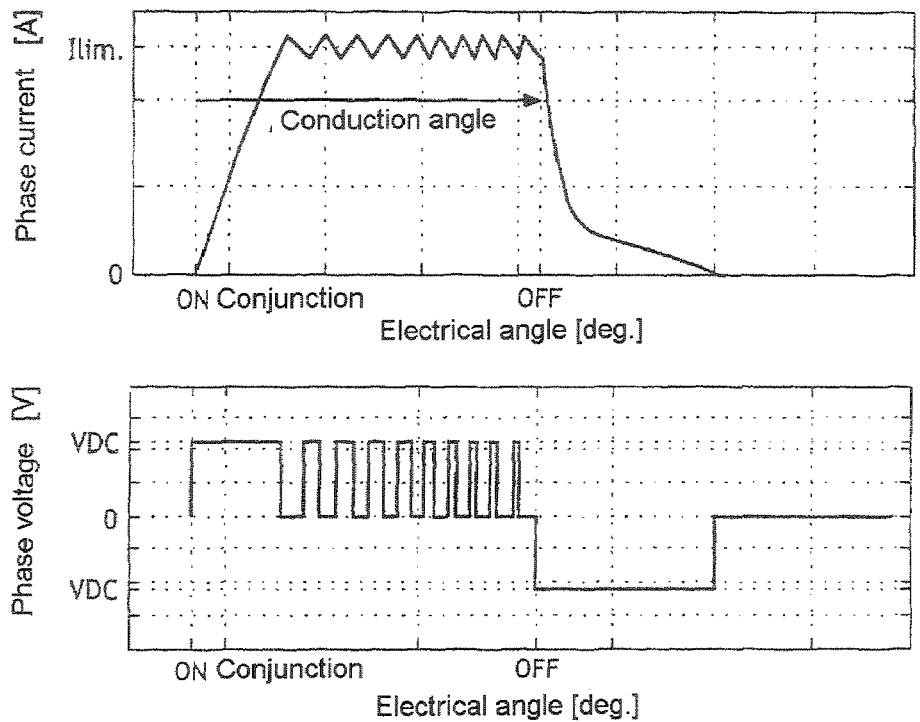
FIG.3  Current in a motor phase and voltage applied to the latter according to the electrical angle at low speed
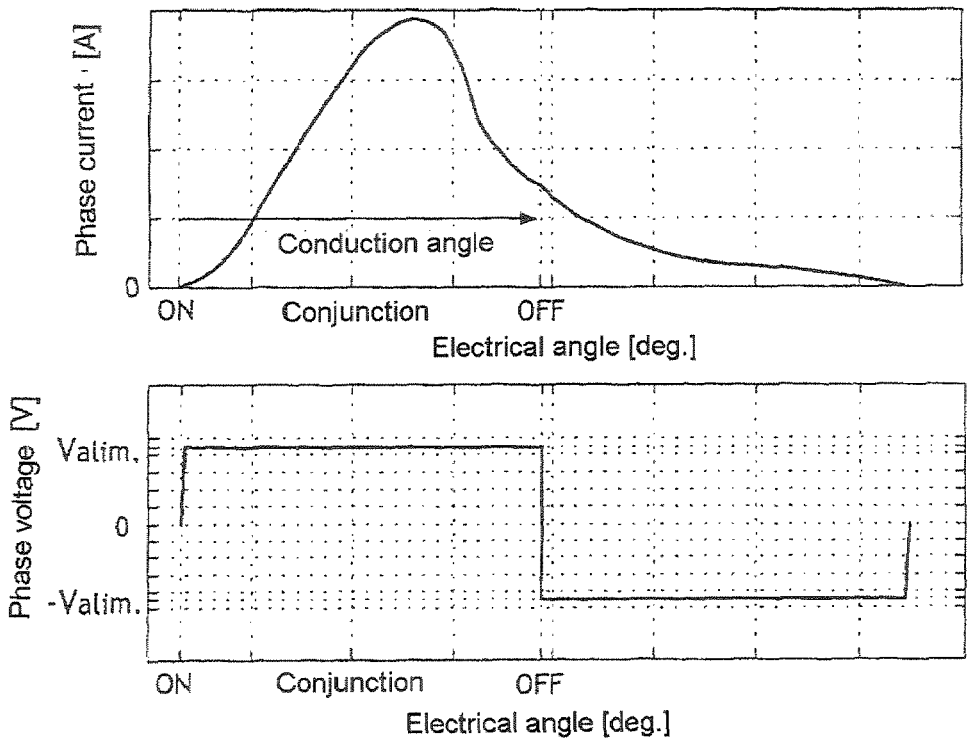
FIG.4  Current in a motor phase and voltage applied to the latter according to the electrical angle at high speed

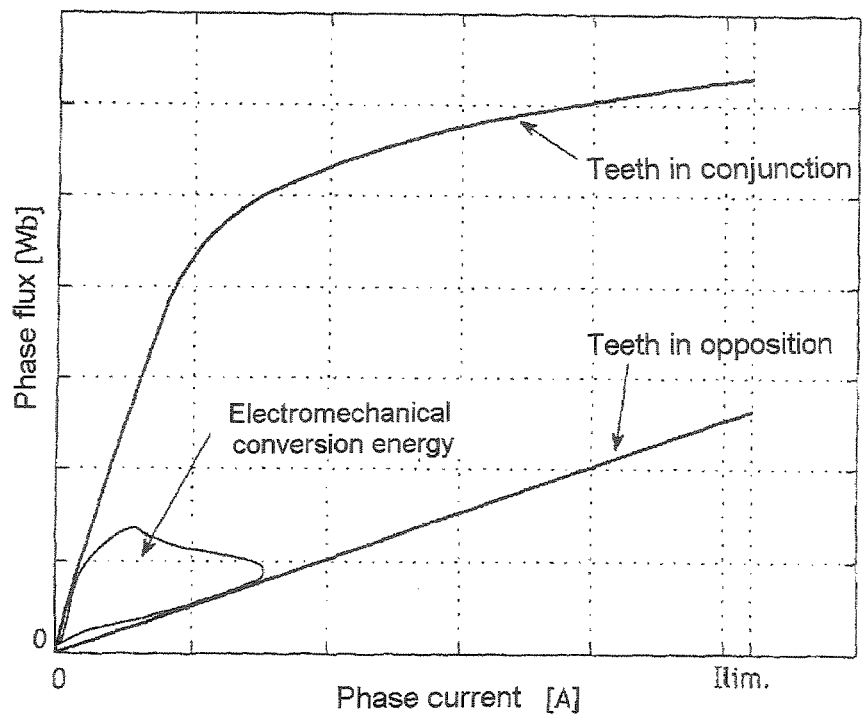
FIG.5 Energy transmitted in an electrical period at high speed
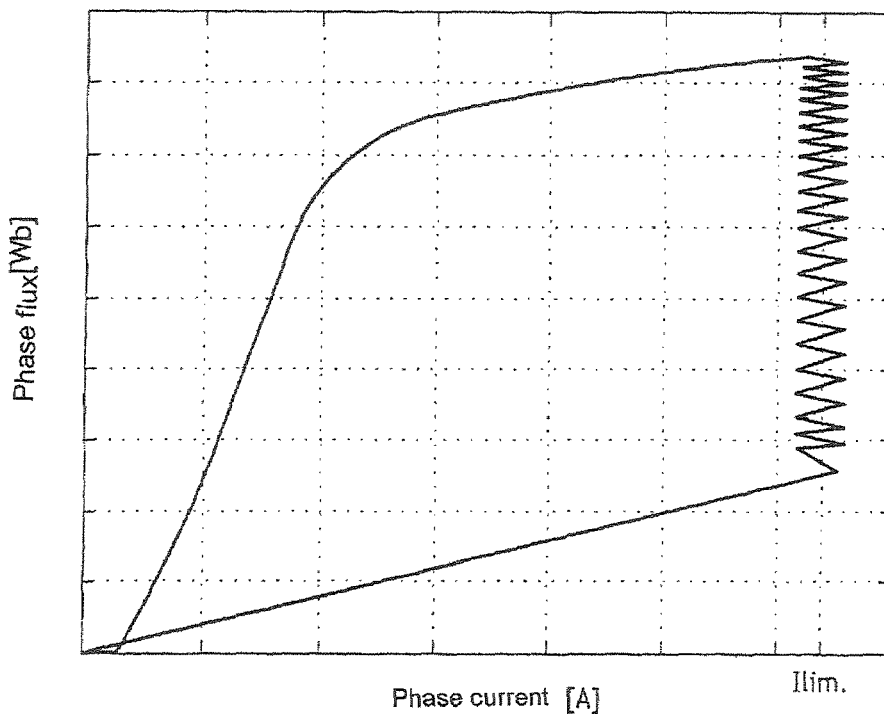
FIG.6 Energy transmitted in an electrical period at low speed

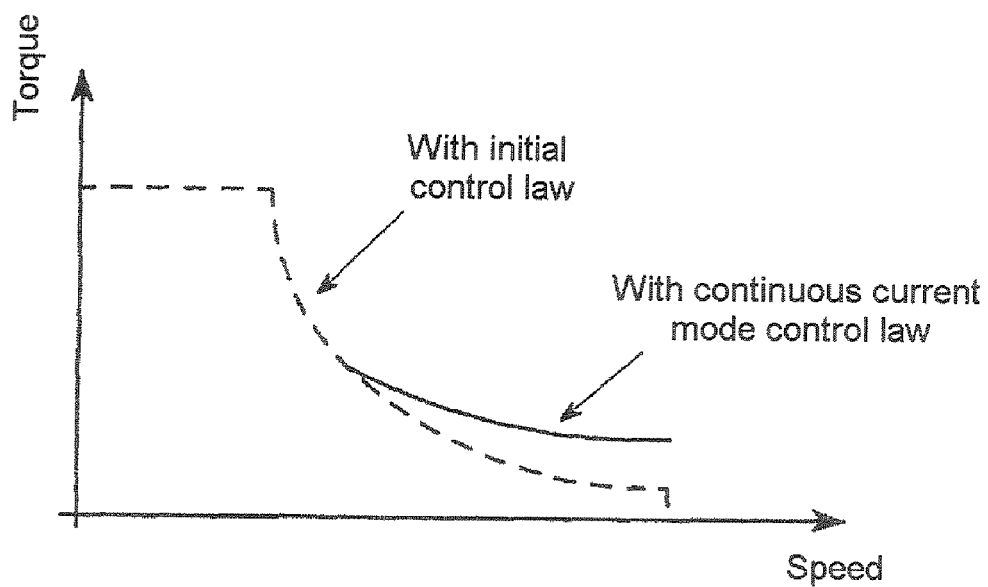
FIG.7  Improved curve of maximum torque versus speed
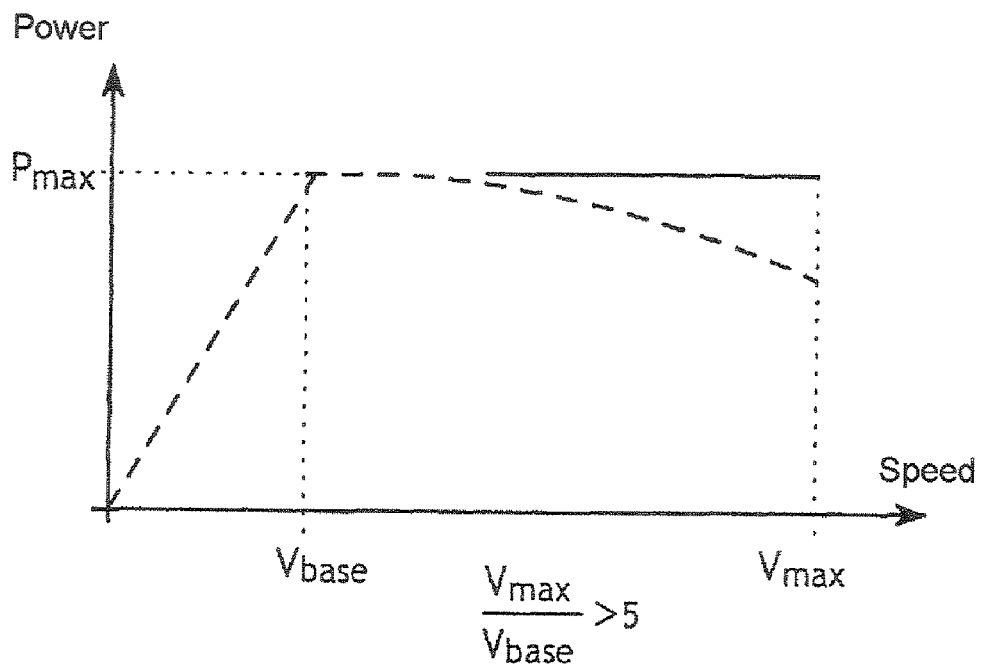
FIG.8  Power gain provided by the continuous current mode

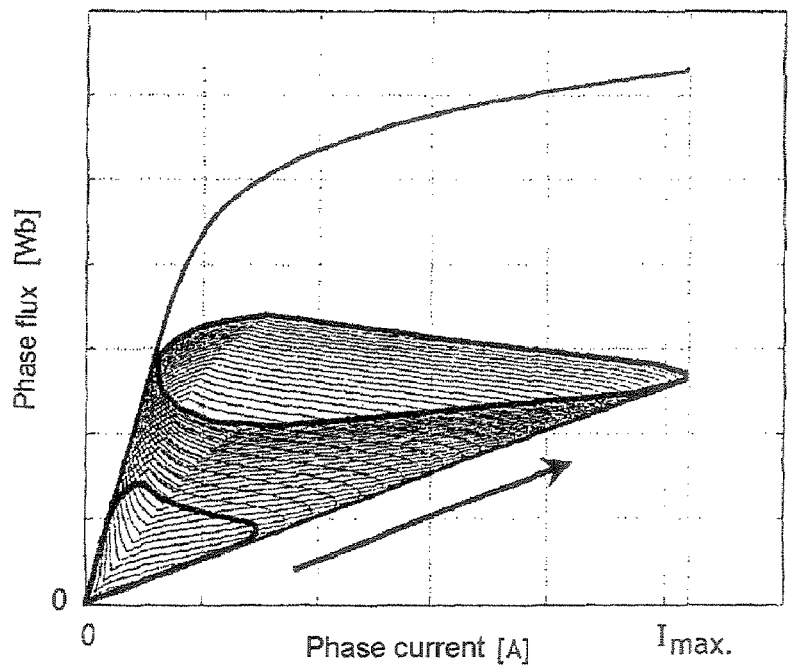
FIG.9 Trend of energy transmitted over several electrical periods with Θp > 180°
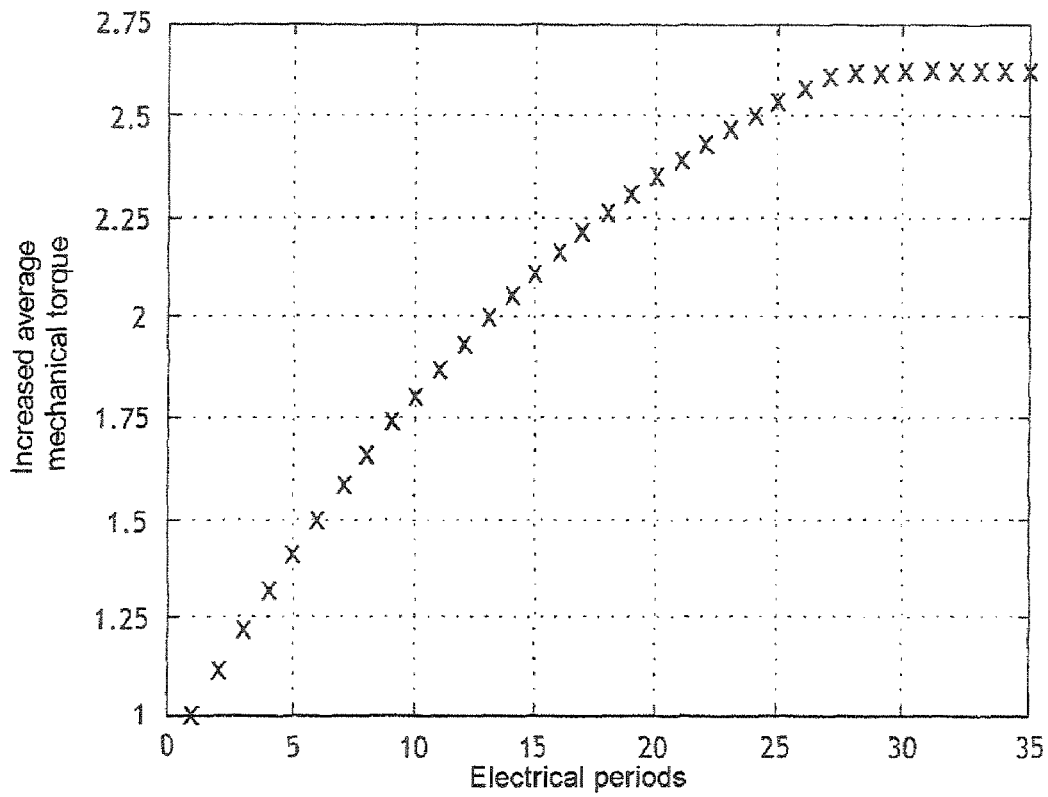
FIG.10 Relative increase in the average torque over each electrical period

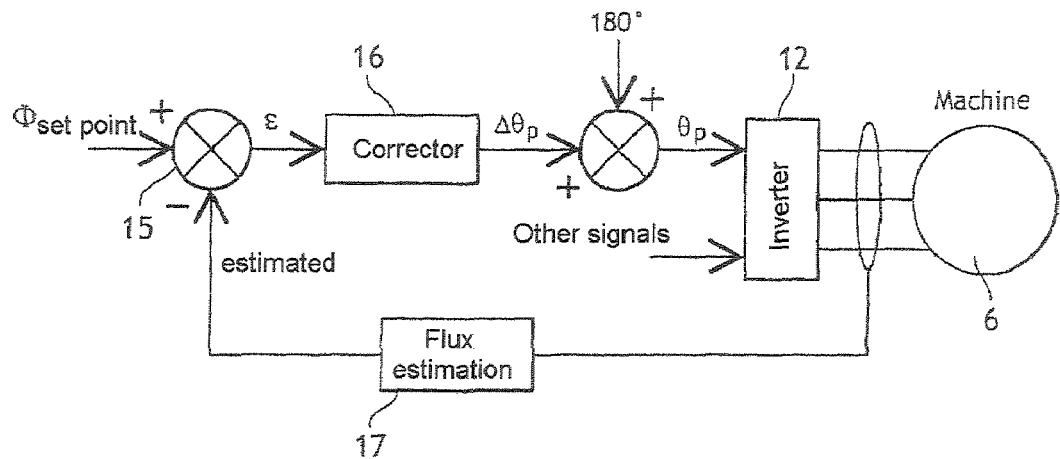
FIG.11   Flux regulation
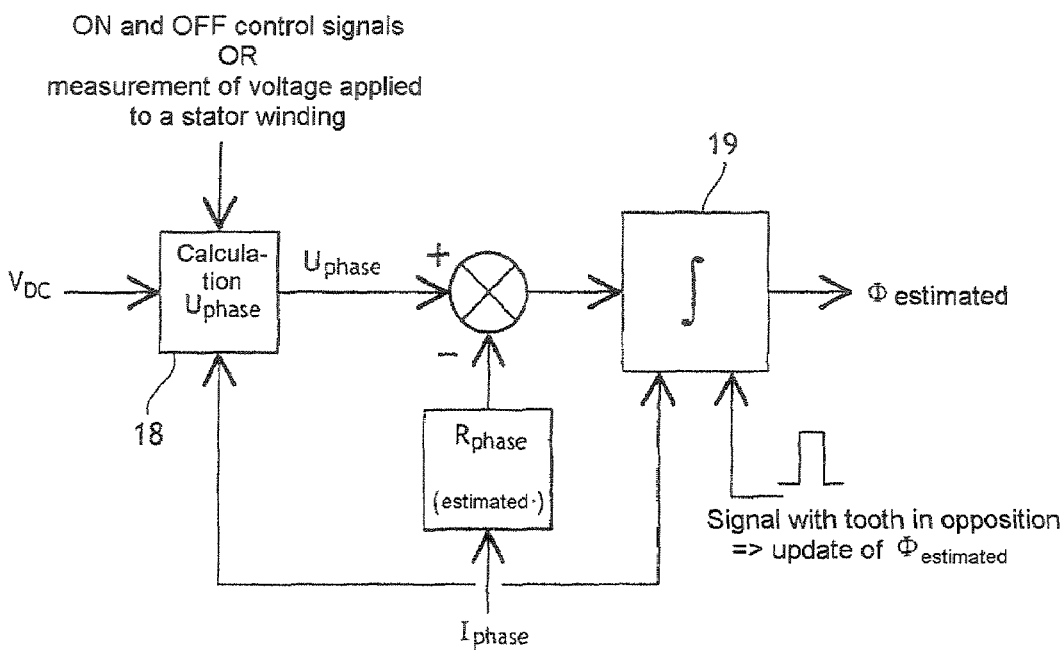
FIG.12   Estimation of phase flux

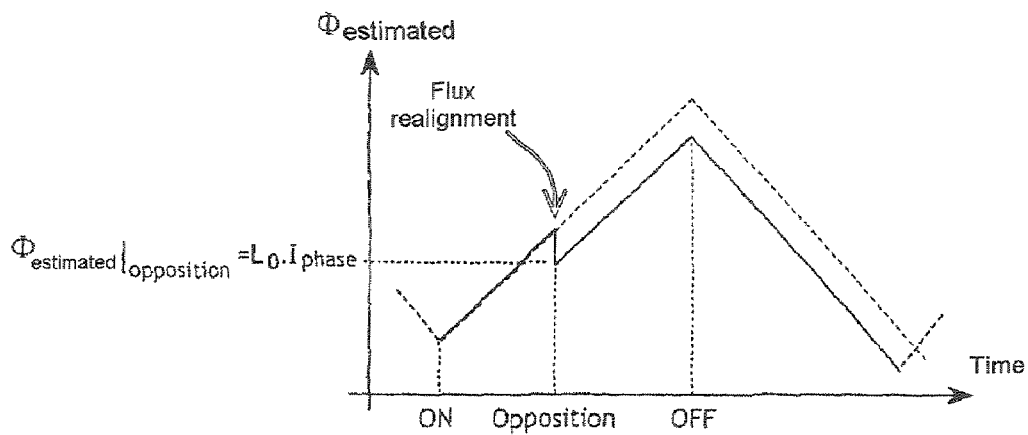
FIG.13  Estimated flux realignment procedure
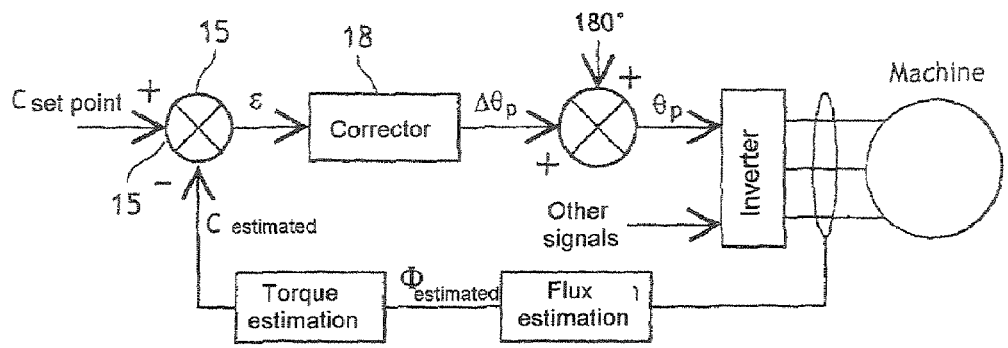
FIG.14  Direct torque regulation
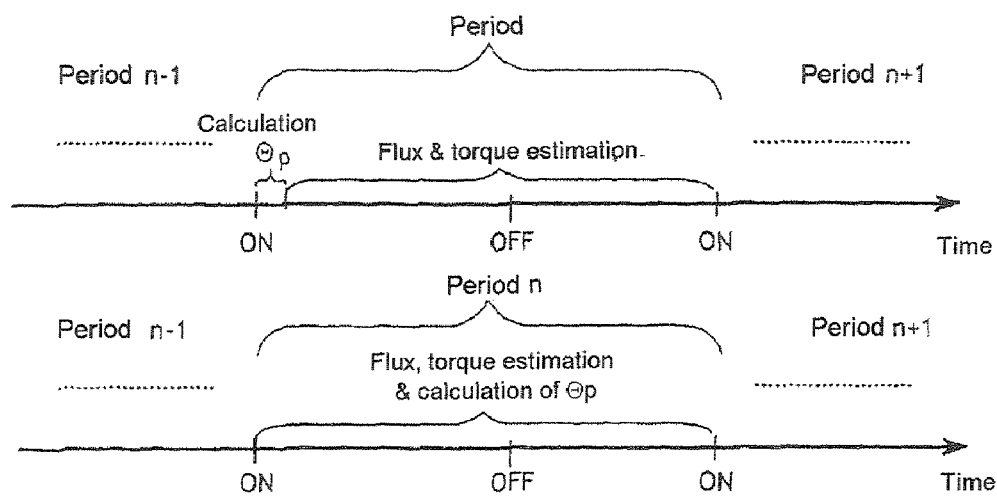
FIG.15  Torque regulation calculation sequence

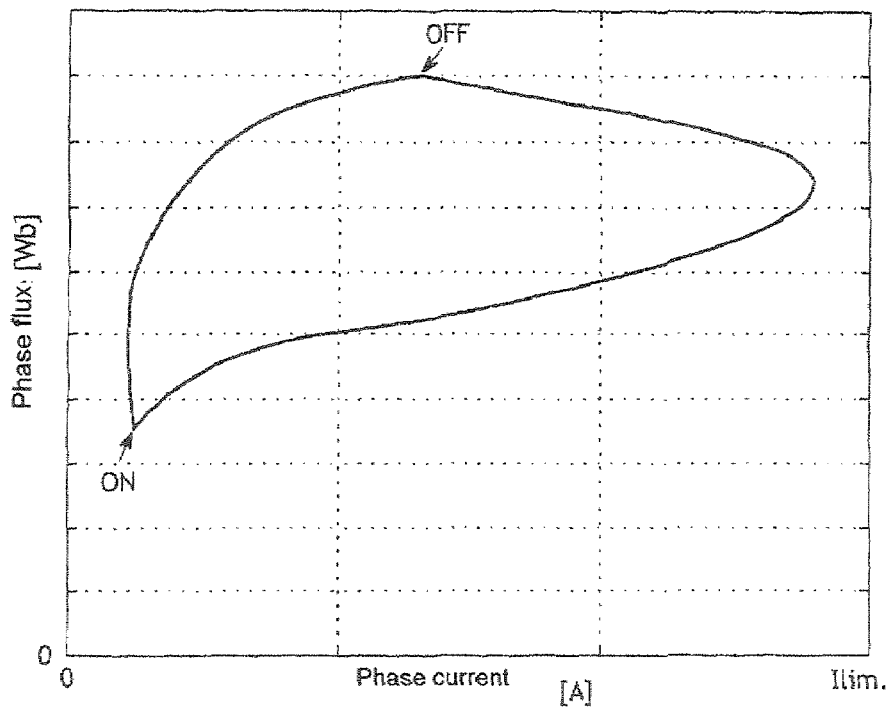
FIG.16  Energy cycle over an electrical period in continuous current mode
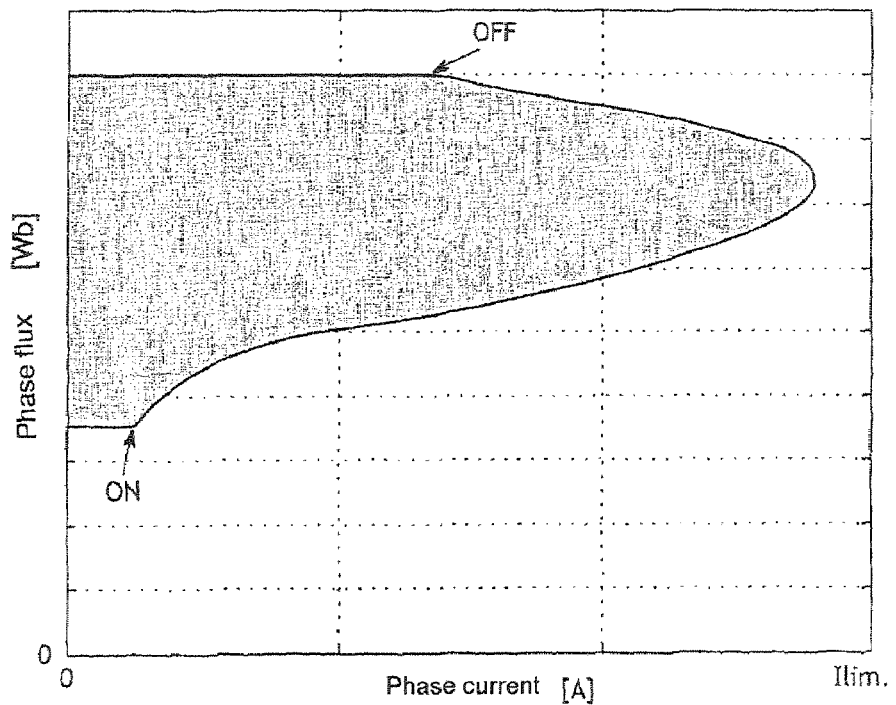
FIG.17  Energy transmitted in magnetization phase (motor mode) for the cycle of figure 16

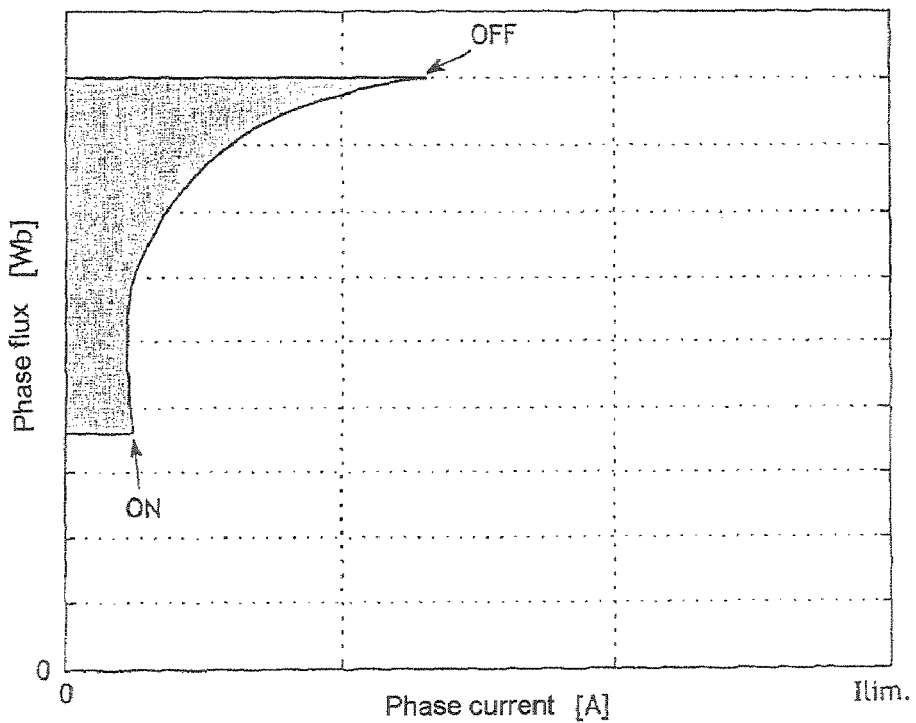
FIG.18  Energy returned in demagnetization phase (motor mode) for the energy cycle
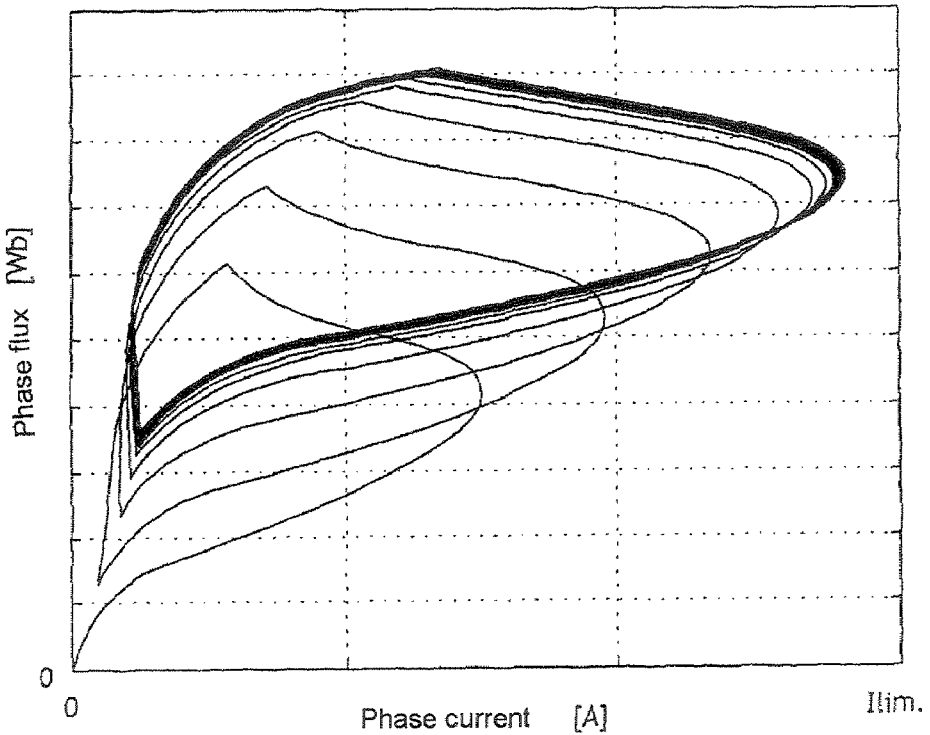
FIG.19  Trend of the energy cycle with a torque control

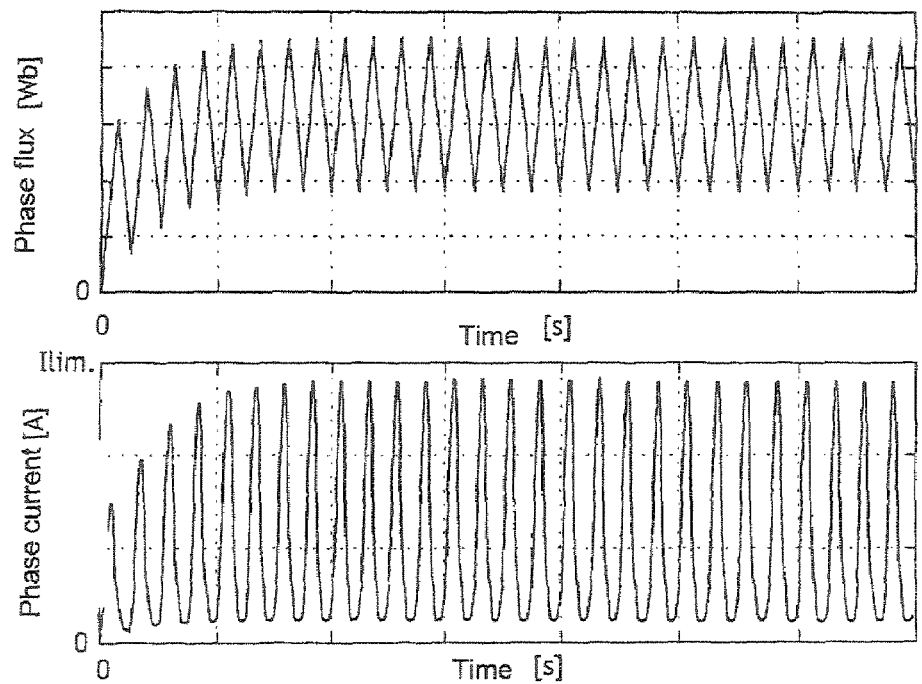
FIG.20  Trend over time of the flux and current with a torque control
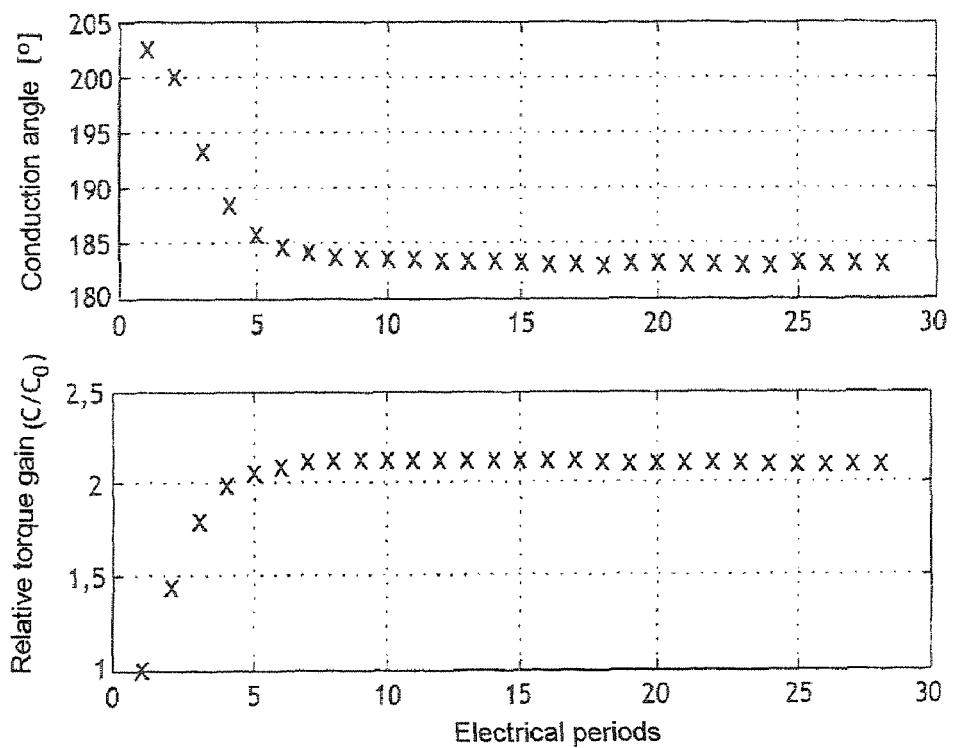
FIG.21  Trend of the conduction angle and torque gain in each period with a torque control

METHOD FOR CONTROLLING THE OPERATION AND CONTINUOUS CURRENT MODE OF A DRIVE ASSEMBLY FOR A MOTOR VEHICLE PROVIDED WITH AN INTERNAL COMBUSTION ENGINE

BACKGROUND OF THE INVENTION

I. Field of the Invention

The invention relates to the drive assemblies of vehicles comprising an internal combustion engine, and control methods for such assemblies.

II. Description of Related Art

FIG. 1 represents one conventional exemplary embodiment of such an assembly. The assembly 2 forms a motor vehicle drive assembly. In a manner known per se, this assembly comprises an internal combustion engine 4, such as a petrol motor or a diesel motor. It comprises an alternator-starter formed by a variable reluctance machine 6 of a type known per se. This machine 6 can be mechanically linked to the motor 4 to provide the latter with a torque, particularly in order to start it when it is stopped. This mechanical link of a type known per se carries the reference 8 in FIG. 1. The assembly comprises a control unit 10 comprising conventional computer means enabling it to control the various units of the assembly as will be seen below. The assembly 2 also comprises an inverter 12 by means of which the control unit 10 drives the operation of the electronic machine 6.

The assembly 2 also comprises a position sensor and/or a speed sensor 14 enabling the unit 10 to know a measurement of the speed of the machine 6 at each instant.

FIG. 2 represents a conventional inverter topology for controlling a motor phase. In this FIG. 2, $V_{DC}$ represents the DC voltage powering the inverter, $I_1$ and $I_2$ two electric switches that can be switched open and closed and $D_1$ and $D_2$ are two diodes.

A control method for such a vehicle drive assembly (comprising, as has been seen, a reluctance machine associated with an inverter) is normally used to control the torque delivered by this drive assembly.

Even more specifically, such a control method of a vehicle drive assembly is designed, for a given power supply voltage, and for a given inverter/reluctance machine assembly, to deliver the greatest possible torque (both in motor mode and in generator mode) over the operating range of the machine, and this mainly at high speeds.

The effective aim is to achieve the best cost/weight/volume trade-off for the machine-inverter drive assembly.

FIGS. 3 and 4 illustrate the shape of the phase currents and voltages as represented in FIG. 2, respectively at low speed and at high speed, according to the electrical angle of the rotor (this angle being zero when the tooth of the rotor is in conjunction with the tooth of the stator).

It is known that a variable reluctance machine such as the machine 6 in FIG. 1 is essentially controlled by three variables:

the start of magnetization ON and end of magnetization OFF angles;

and, at low speeds, the peak phase current which is regulated ($I_{lim}$).

The phase of the machine is magnetized in the time interval formed by the conduction angle Θp=OFF-ON.

It will be noted that, to obtain a complete demagnetization, the conduction angle Θp must be less than 180°.

In order to control the variable reluctance machine, the control parameters (ON, Θp, $I_{lim}$) at low speed and (ON, Θp) at high speed are used as input parameters for the control unit 10; these parameters being optimized for each torque-speed operating point.

As illustrated in FIG. 1, and in a manner known per se, the machine 6 is controlled by the control unit 10 by means of control laws taken from tables that give the ignition (ON) conduction (Θp) and peak current ($I_{lim}$) angles according to the speed of the machine obtained from the sensor 14. These quantities are also determined according to the torque to be delivered by the link 8. If necessary, it is also possible to take account of the DC power supply voltage $V_{DC}$ of the inverter if the latter is likely to vary, and other parameters such as the temperature of the windings, for example.

In each electrical period, a pointer is defined according to these external parameters (speed, power supply voltage, temperature of the windings, etc.) and the torque set point. This pointer then addresses the angle tables which give the control parameters (ON, Θp, $I_{lim}$) at low speed and (ON, Θp) at high speed.

The torque delivered by the machine 6 at constant speed is proportional to the energy transmitted by a phase of the motor. It is therefore proportional to the surface area of the curves represented in FIGS. 5 and 6 which illustrate the trend of the flux associated with a phase of the machine as a function of the phase current, for a machine operating respectively at high speed and at low speed.

The energy derived from the electromechanical conversion is thus characterized by the surface area (or energy cycle) delimited by the path taken by the phase flux and the phase current during an electrical period. FIGS. 5 and 6 thus represent the energy transmitted in an electrical period for a machine operating respectively at high speed and at low speed.

It can be seen that, at high speed, the energy cycle is very small compared to the quantity of energy that is potentially usable, that is, as delimited by the minimum phase inductance (teeth in opposition), maximum phase inductance (teeth in conjunction), and the maximum allowable phase current $I_{lim}$.

At low speed, however, it can be seen that the energy cycle is better used, the path taken delimiting almost all the maximum surface area.

In order to make up for the low efficiency at high speed de facto limiting the torque available on the motor shaft, an operating mode called continuous current mode has been proposed whereby a conduction angle Θp greater than 180° electrical (the fluxing time being greater than the defluxing time) is applied.

Such a conduction angle Θp greater than 180° for operation in continuous current mode can be expressed Θp=ΔΘp+180°, where ΔΘp is called additional conduction angle.

FIGS. 7 and 8 show the benefit of the continuous current mode: for one and the same inverter-machine assembly and one and the same power supply voltage, a significant torque gain can be obtained at high speeds.

FIG. 7 (respectively 8) can be used to compare the maximum torque (respectively power) as a function of the speed that can be obtained with the conventional control law (broken lines) and with the continuous current mode control law (solid lines).

It can be seen that a net torque (respectively power) gain is obtained when the continuous current mode is used.

FIG. 9 shows the trend, under the effect of the application of a conduction angle Θp greater than 180°, of the energy transmitted over several electrical periods at constant rotation speed. The gradual saturation from period to period produces a rise in the energy cycle (i.e. the surface area covered) and therefore in the torque available on the motor shaft.

FIG. 10 shows the gradual increase in the average torque delivered by the machine over each electrical period, relative to the first period, given the same conditions of operation as those of FIG. 9. The discontinuity in the torque increase represented in FIG. 10 originates from the action of a regulation law that acts on the control laws (ignition and blocking angles, and peak current limiting) so as to keep the energy cycle, and therefore the torque, constant.

It should be stated here that the torque gain depends:
on the speed of the machine,
on the very design of the machine,
on the control applied (angles, current limiting, freewheeling).

As has been seen above, in particular in light of FIGS. 7 and 8, the continuous current mode is advantageous in that it provides for a significant torque gain at high speeds.

The continuous current mode is, however, an intrinsically unstable mode, in which the stability of the flux and the stability of the current are difficult to control.

Moreover, as has been seen above, when the continuous current mode is used, the average torque increases over several electrical periods before reaching its set point level (unlike a conventional operation, in discontinuous mode, for which the desired average torque is obtained after the first electrical period). In continuous current mode, the response of the system to a desired set point torque is therefore fairly unresponsive.

Document EP 0 534 761 envisages stabilizing an operation in continuous current mode, obtained by means of an increase in the conduction time of the machine beyond half of an electrical period, in order to exploit the torque gain at high speeds offered by this operating mode. This document shows that it is possible to regulate the flux, and therefore indirectly the torque, by varying the conduction angle $\Theta p$.

However, this document simply uses control parameters preprogrammed and stored in a mapping table and in no way specifies how the conduction angle $\Theta p$ is varied. A fortiori, this document does not envisage any dynamic control law of the conduction angle $\Theta p$.

Moreover, this document does not in any way broach the issue of the low responsiveness of the system in continuous current mode to reach a set point torque.

BRIEF SUMMARY OF THE INVENTION

The object of the invention is to propose a dynamic control of the variable reluctance machine suitable for allowing the control of a motor vehicle drive assembly in continuous current mode while ensuring the stability of the flux and of the current in the machine.

More specifically, the invention aims to improve the responsiveness of a vehicle drive assembly in continuous current mode to achieve a set point torque in a minimum of electrical periods.

To this end, the invention proposes, according to a first aspect, a control method for a vehicle drive assembly, characterized in that a conduction angle set point value greater than 180° is applied to a variable reluctance machine to operate the machine in continuous current mode, the angle being adjusted according to a control measurement of the operating stability of the machine in this continuous current mode.

Certain preferred, but non-limiting aspects of this method are as follows:
the stability control measurement can be carried out using an estimation of the phase flux;
the flux can be estimated by integrating the voltage applied to this phase in an electrical period according to $\Phi \text{estimated} = \int (U_{phase} - R_{phase} \cdot I_{phase}) dt$, where $R_{phase}$ designates the resistance of the stator winding, $U_{phase}$ the phase voltage and $I_{phase}$ the phase current;
a direct measurement of the phase voltage is carried out;
the start and end of magnetization control instructions and the phase current are used to determine the phase voltage, the latter being equal to the power supply voltage $V_{DC}$ during the magnetization time, to $-V_{DC}$ during the demagnetization time, and to zero during the freewheeling phases or when the phase current is zero;
the flux estimation can be periodically updated using a measurement flux value;
the flux estimation is realigned in each electrical period, at the time of the transition to opposition, on the value $L_0 \cdot I_{phase}$ where $L_0$ is the inductance in opposition and $I_{phase}$ the current measured at the instant of the transition to opposition;
the stability measurement can be a control measurement of the flux according to which the difference between the value of the set point flux and the value of the estimated flux is measured;
the stability measurement can be a control measurement of the torque according to which the difference between the value of the set point torque and an estimated torque value obtained from said flux estimation is calculated;
the torque can be estimated, using the flux estimation, by calculating the difference between the energy transmitted in the magnetization phase and the energy returned in the demagnetization phase;
the difference can be processed by a corrector provided with a correction law suitable for modifying the conduction angle applied to the machine so as to make said difference zero;
the correction law can be of proportional-integral type;
it is possible to apply to the machine, over an electrical period, a conduction angle $\Theta p$ calculated from the estimation of the flux calculated in the preceding electrical period;
the flux estimation value in the first period can be imposed on a predetermined value, such as that of the flux obtained for a conduction angle of 180°.

According to a second aspect, the invention proposes a drive assembly for motor vehicle comprising:
an internal combustion engine;
a variable reluctance machine; and
a control unit, characterized in that the control unit is designed to apply to the machine a conduction angle $\Theta p$ set point value greater than 180° for an operation of the machine in continuous current mode which is adjusted according to a control measurement of the operating stability of the machine in this continuous current mode.

Some preferred, but non-limiting, aspects of this drive assembly are as follows:
the control unit comprises means for calculating a flux estimation and for adjusting the conduction angle according to this installation;
the control unit comprises means for carrying out a control measurement of the flux by calculating the difference between the set point flux value and the estimated flux value, and for adjusting the conduction angle according to this flux control measurement;
the control unit comprises means for carrying out a control measurement of the torque by calculating the difference between the set point torque value and a torque value estimated from the flux estimation, and for adjusting the conduction angle according to this torque control measurement.

Finally, the invention provides for a vehicle comprising an assembly according to the second aspect of the invention.

BRIEF DESCRIPTION OF THE DRAWINGS

Other aspects, aims and advantages of the invention will become more apparent from reading the detailed description below of preferred embodiments of the latter, given by way of nonlimiting example and described with reference to the appended drawings.

In the drawings:

FIG. 3 illustrates a shape of the phase currents and voltages as represented in FIG. 2 at low speed;

FIG. 4 illustrates a shape of the phase currents and voltages as represented in FIG. 2 at high speed;

FIG. 5 represents energy transmitted in an electrical period for a machine operating at low speed;

FIG. 6 represents energy transmitted in an electrical period for a machine operating at high speed;

FIG. 7 shows an improved curve of maximum torque versus speed in the continuous current mode;

FIG. 8 shows a power gain provided by the continuous current mode;

FIG. 9 shows a trend of the energy transmitted over several electrical periods;

FIG. 10 shows a gradual increase in the average torque delivered by the machine over each electrical period;

FIG. 11 represents one possible embodiment of the flux regulation by control of the conduction angle applied to the machine according to a flux control measurement;

FIG. 12 represents one possible embodiment of a phase flux estimator;

FIG. 13 illustrates the realignment of the estimated flux;

FIG. 14 represents one possible embodiment of the torque regulation by control of the conduction angle applied to the machine according to a torque control measurement;

FIG. 15 represents the sequencing of the calculation of a torque regulation;

FIG. 16 represents the energy cycle over an electrical period in continuous current mode;

FIG. 17 represents the energy transmitted in magnetization phase for the cycle of FIG. 16;

FIG. 18 represents the energy returned in demagnetization phase for the cycle of FIG. 16;

FIG. 19 shows the trend of the energy cycle with a torque control;

FIG. 20 represents the trend over time of the flux and of the current with a torque control;

FIG. 21 represents the trend of the conduction angle and of the torque gain in each period with a torque control;

DETAILED DESCRIPTION OF THE INVENTION

Figure 1:
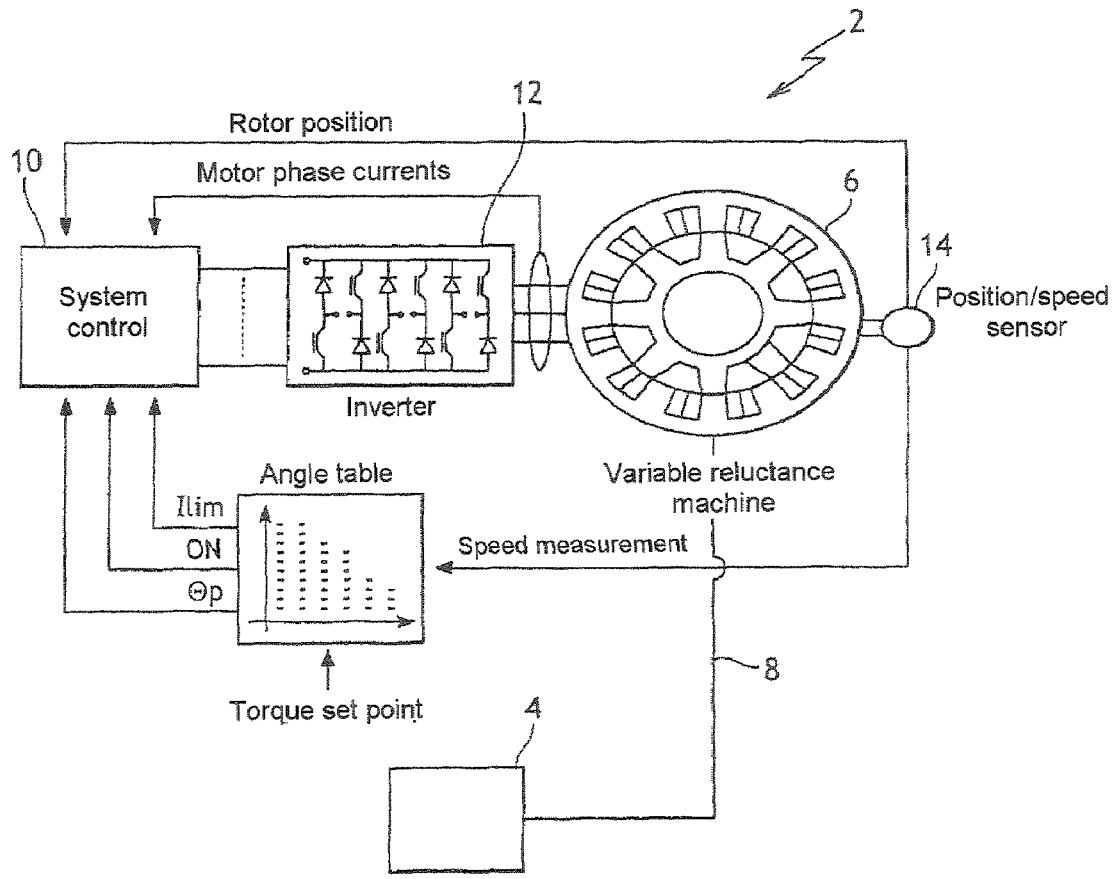
FIG. 1 represents one conventional exemplary embodiment of a drive assembly of a vehicle.
Figure 2:
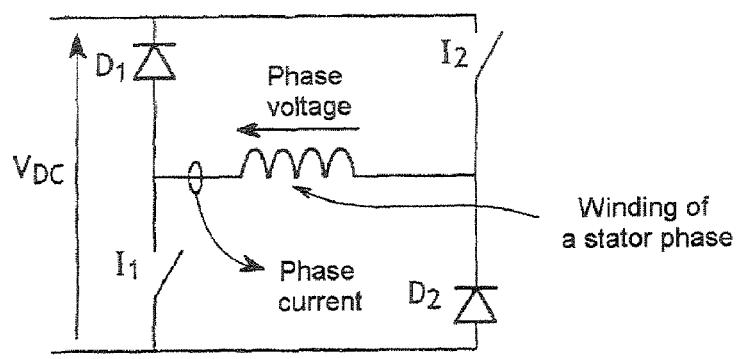
FIG. 2 represents a conventional inverter topology for controlling a motor phase.

The invention proposes a control method for a vehicle drive assembly, characterized in that a conduction angle $\Theta p$ set point value is applied to a variable reluctance machine, the angle being adjusted according to a control measurement of the operating stability of the machine in the continuous current mode.

In other words, the conduction angle $\Theta p$ set point value is constantly adjusted according to any disturbances. Such an adjustment then makes it possible to regulate the flux so as to ensure its stability, and therefore that of the energy cycle.

In the context of the invention, the stability control measurement is performed using a phase flux estimation.

Flux Control

According to a first possible embodiment, the stability measurement is a flux control measurement.

Thus, a set point flux value is compared to the flux estimation to obtain a flux control measurement. A difference measurement between the set point value and the estimated value is then available, representing any flux instability, that is, instability in the operation of the machine in continuous current mode.

This flux control measurement is then used to control the conduction angle $\Theta p$ (greater than 180° for operation in continuous current mode). And with such control the flux can be regulated.

FIG. 11 represents one possible embodiment of the flux regulation by control of the set point value of the conduction angle applied to the machine according to a flux control measurement.

A comparator 15 can be used to calculate an error $\epsilon$ on the flux, equal to the difference between the set point flux $\Phi_{set\text{-}point}$ and the estimated flux $\Phi_{estimated}$ using flux estimation means (bearing the reference 17 in FIG. 11, and one possible embodiment of which will be discussed below with reference to FIG. 12).

This error $\epsilon$ on the flux can be calculated for the maximum value of the flux or any other relative quantity (such as, for example, the average value).

This error $\epsilon$ is processed by a corrector 16 suitable for integrating various correction laws (proportional—integral or others). The conduction angle $\Theta p$ is then modified so as to make the error $\epsilon$ zero (the estimated flux then being equal to the set point flux).

More specifically, the corrector 16 can provide the additional conduction angle $\Delta\Theta p$ which, added to 180°, makes it possible to obtain the conduction angle $\Theta p$ greater than 180° ensuring operation in continuous current mode.

One possible embodiment of the phase flux estimator 17 is detailed below, with reference to FIG. 12.

It will be noted that this estimator can be produced both by a digital controller and by an analog circuit.

The estimation of the flux of a phase is obtained by integrating the voltage applied to this phase: $\Phi_{estimated} = \int (U_{phase} - R_{phase} \cdot I_{phase})dt$, where $R_{phase}$ designates the resistance of the stator winding, $U_{phase}$ and $I_{phase}$ respectively designate the phase voltage and current (as is indicated in FIGS. 3 and 4).

The phase voltage $U_{phase}$ corresponds to the voltage of the power supply $V_{DC}$ during the magnetization time, the voltage $-V_{DC}$ during the demagnetization phase, and 0 during the freewheeling phases or when the current is zero.

The estimator 17 thus comprises means 18 for calculating the phase voltage $U_{phase}$. These means 18 take as input parameters either a direct measurement of the voltage of each stator winding, or even the phase current $I_{phase}$, the power supply voltage $V_{DC}$ and the ON and OFF control signals. In practice, the start and end of magnetization control instructions and the measurement of the phase current make it possible to know the sign of the voltage applied to the winding (positive, negative or zero), so replacing a direct measurement of the voltage of each stator winding.

The value of the phase current $I_{phase}$ is obtained, in a manner known per se, as is represented in FIG. 1, by electrical measurement at the output of the inverter 12.

An integrator 19 can be used to calculate the flux estimation according to the equation $\Phi_{estimated}=\int(U_{phase}-R_{phase}\cdot I_{phase})dt$, presented above.

In practice, however, the measurements always present errors and, above all, the resistance of the winding of a phase $R_{phase}$ is highly variable (particularly with temperature). According to one advantageous embodiment of the estimator 17, the estimated flux at the output of the integrator 19 is realigned on each electrical period.

According to one possible embodiment of the invention, this realignment is done on the transition to opposition because, at this moment, the inductance of the phase is at its most constant (therefore independent of the phase current) which minimizes the errors and simplifies the flux estimation.

The estimated flux on the transition to opposition $\Phi_{estimated|opposition}$ is therefore such that $\Phi_{estimated|opposition}=Lo\cdot I_{phase}$, where Lo is the inductance in opposition (which can be measured with the rotor blocked in opposition, for example) and $I_{phase}$ is the phase current measured at this instant. FIG. 13 provides a diagram illustrating such a realignment of the estimated flux.

The output of the integrator is thus forced in each electrical period, on the transition to opposition, by the updating of the flux value ($Lo\cdot I_{phase}$).

To return to the description of FIG. 11, the flux control measurement (that is, in this case, the calculation of the error $\epsilon$ between the set point value $\Phi_{setpoint}$ and the estimated flux $\Phi_{estimated}$) is, for example, carried out on the maximum value of the flux obtained at the end of the magnetization period.

By applying a conduction angle $\Theta p$ set point value to the machine that is dependent on this flux control measurement, any divergence of the flux and of the phase current with a noticeable gain on the torque is thus avoided.

The flux control parameter is thus the conduction angle $\Theta p$ calculated on each electrical period by the control law described above taking a flux estimation into consideration.

It should be noted that the other machine control parameters (magnetization start angle ON, limitation of the phase current $I_{lim}$) remain unchanged. In particular, these parameters (ON, $I_{lim}$) can be derived, in a manner known per se and as already mentioned previously, from angle tables.

Since the flux estimation is effective only after the first electrical period (the set point Op being in effect calculated from the flux estimated in the preceding electrical period), it is planned, in the presence of a torque step, to impose the flux estimated in the first period at a predetermined value (such as the flux value obtained at $\Theta p=180°$ for example, the error $\epsilon$ thus being set to zero).

The flux control as described previously makes it possible to stabilize operation in continuous current mode. However, the additional torque control provided by the continuous current mode may not be sufficiently precise.

Torque Control

According to another possible embodiment of the invention, control of the conduction angle $\Theta p$ is obtained not by a flux control measurement, but by a torque control measurement.

This torque control measurement measures the error $\epsilon$ between the set point torque $C_{setpoint}$ and an estimation of the torque $C_{estimated}$, which is obtained from the estimation of the flux $\Phi_{estimated}$.

At fixed speed, a torque estimation is determined using the flux estimation then by determining an estimation of the transmitted energy.

Knowing the flux, the torque can actually be estimated by the difference between the energy transmitted in the magnetization phase and the energy returned in the demagnetization phase.

The energy transmitted on magnetization is: $Emag=\int_{ON}^{OFF}I_{phase}d\phi$, where $\Phi$ is the estimated phase flux.

It should be noted that the flux is strictly increasing during this phase; it reaches its maximum at the end of magnetization (OFF).

On demagnetization, the returned energy is $Edemag=\int_{OFF}^{ON}I_{phase}d\phi$. In this phase, the flux is strictly decreasing.

Algebraically, Emag and Edemag have opposite signs. The sum of these two quantities (or the difference of their absolute values) represents the converted energy and is therefore an image of the electromechanical torque of the machine.

Over an electrical period, the average electromechanical torque delivered is proportional to the surface area of the energy cycle represented by FIG. 16.

Knowing the flux at each instant from flux estimator 17 described previously, and having a measurement of the phase current and an image of the voltage applied to the winding (which, as has already been mentioned, can be measured directly or estimated via the control and the value of the current), it is possible to have an image of the electromechanical torque by direct calculation of the energy represented by this surface area.

This energy can thus be calculated in two phases.

During a first phase, the energy exchanged in the magnetization phase $Emag=\int_{OFF}^{ON}I_{phase}d\phi$, as represented by the surface area of FIG. 17, is calculated.

During a second phase, the energy exchanged in the demagnetization phase $Edemag=\int_{OFF}^{ON}I_{phase}d\phi$, as represented by the surface area of FIG. 18, is calculated.

The converted energy corresponds to the difference of the two surface areas represented in FIGS. 17 and 18, or even to the algebraic sum of the values Emag and Edemag (these being of opposite signs).

FIG. 14 represents one possible embodiment of the flow regulation by control of the conduction angle $\Theta p$ set point value applied to the machine according to a torque control measurement.

This FIG. 14 will be reconciled with FIG. 11 already discussed previously.

The error $\epsilon$ between the average set point torque and the estimated average torque is controlled by a corrector which uses an appropriate law (proportional—integral for example) to supply the additional conduction angle $\Delta\Theta p$ with which to ensure a conduction angle $\Theta p$ above 180° and therefore an operation in continuous current mode.

In such a case, according to the diagram of FIG. 14, the conduction angle control law makes it possible to directly control the machine torque.

The estimation of the average torque of a period is, however, known only at the end of this period. The following period must integrate the calculation of the control $\Theta p$ to be applied for the current period (dependent on the calculation of the average torque estimated in the preceding period). Since the result of this calculation has to be ready before the end of the magnetization while estimating the torque of the present period, two options among others emerge.

According to a first option, the calculation of the control $\Theta p$ can be carried out in parallel with the estimation of the torque (and therefore of the flux) during the start of magnetization. The bottom timing diagram of FIG. 15 illustrates this first option.

According to a second option, the start of the magnetization period can be devoted to calculating the control θp, the torque estimation commencing thereafter. A linear extrapolation is then done over this period so as to estimate the torque and the flux. The top timing diagram of FIG. 15 illustrates this option.

In the context of a torque control carried out in accordance with the possible embodiment of the invention discussed above, there are represented:

in FIG. 19, the trend of the energy cycle;
in FIG. 20, the trend over time of the flux and of the current,
in FIG. 21, the trend of the conduction angle and of the relative torque gain during several electrical periods.

FIG. 19 illustrates the gradual increase of the energy cycle (i.e. of the surface area covered) and therefore of the torque available on the motor shaft.

FIG. 20 illustrates the stability of the flux and of the phase current obtained by the invention in continuous current mode.

FIG. 21 illustrates the increased dynamic range obtained by the invention, the torque supplied reaching the set point value in a small number of periods.

Figure 22:
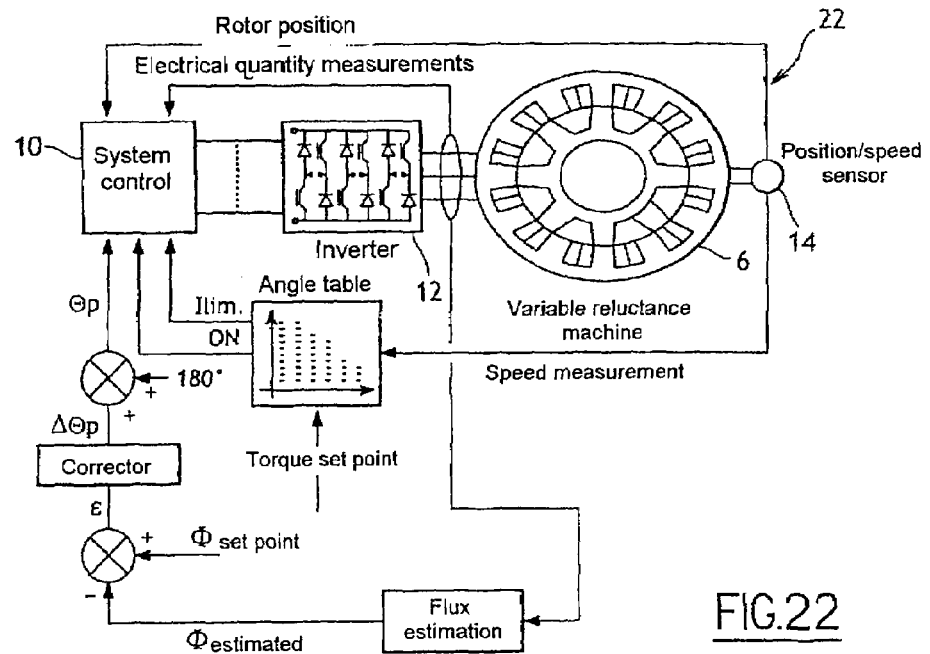
FIG. 22 represents an assembly in which the value of the conduction angle applied to the machine is adjusted based on a flux control measurement.
Figure 23:
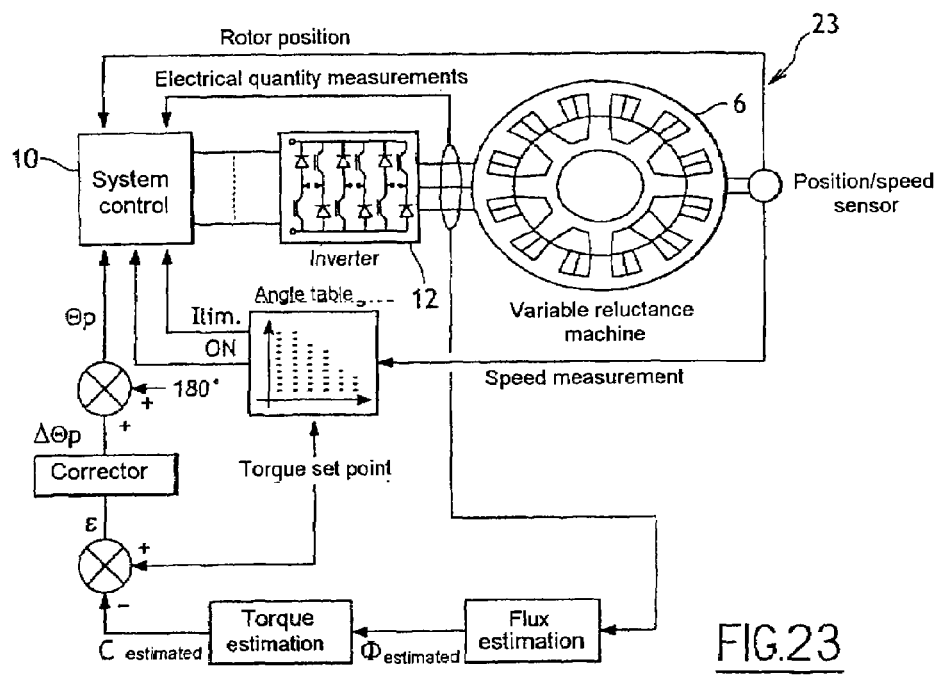
FIG. 23 represents an assembly in which the value of the conduction angle applied to the machine is adjusted based on a torque control measurement.

FIGS. 22 and 23 represent an assembly 22, 23 according to the two possible embodiments of the invention explained previously, and in which the value of the conduction angle applied to the machine is adjusted respectively based on a flux control measurement and based on a torque control measurement.

Phase Current Control

As for the phase current, this can be controlled by limiting the current by acting on the control angles. This limitation can also be imposed using an active control of the peak current by switching switches that limit the current in case of divergence.

The invention finally makes it possible to use the continuous current mode while ensuring the stability of the flux and of the current in the machine. Also, the control of the dynamic range provides for a rapid response at a required torque step which has numerous advantages for the system.

Thus, in motor mode, the invention makes it possible to improve the services required by numerous applications, in particular in the motor vehicle field.

In generator mode, the invention can be used, for one and the same load step, to reduce the duration and the depth of the smoothing capacitor voltage drop, or even to reduce the capacitance itself with equal disturbance on the voltage. In other words, in generator mode, the gain in response dynamic range of the electromagnetic torque makes it possible to reduce the smoothing capacitance with equal voltage limits, or even makes it possible to reduce the voltage limits with equal filtering capacitance.

Obviously, the controls discussed previously can be used independently on each phase of the machine. It is also possible to apply the same controls (ON, $I_{lim}$, Θp) to the three phases during one and the same electrical period.

It should be mentioned that it is also possible to use any regulation law (for correcting the error ε), suited to the chosen application so as to obtain the best dynamic range/stability trade-off for the continuous current mode.

The invention claimed is:

1. A control method for a vehicle drive assembly, comprising:

applying a conduction angle set point value greater than 180° to a variable reluctance machine to operate the machine in a continuous current mode, the angle being adjusted according to a stability control measurement of operating stability of the machine in the continuous current mode, the stability control measurement being carried out using an estimation of phase flux, and the stability measurement being a control measurement of the flux according to which a difference between a value of a set point flux and a value of estimated flux is measured;

correcting the difference between the set point flux and the estimated flux to determine an additional conduction angle; and adding 180° to the additional conduction angle to determine the adjusted conduction angle set point value to apply to the machine.

2. The method as claimed in claim 1, wherein the phase flux is estimated by integrating a voltage applied to a phase in an electrical period according to $\Phi estimated = \int (U_{phase} - R_{phase} \cdot I_{phase}) dt$, where $R_{phase}$ designates resistance of a stator winding, $U_{phase}$ phase voltage, and $I_{phase}$ phase current.

3. The method as claimed in claim 2, wherein a direct measurement of the phase voltage is carried out.

4. The method as claimed in claim 2, wherein a start and end of magnetization control instructions and the phase current are used to determine the phase voltage, the phase voltage being equal to power supply voltage during a magnetization time, to a demagnetization time, and to zero during freewheeling phases or when the phase current is zero.

5. The method as claimed in claim 1, wherein the flux estimation is periodically updated using a measured flux value.

6. The method as claimed in claim 5, wherein the flux estimation is realigned, in each electrical period, at a time of transition to opposition, on value $L_0 \cdot I_{phase}$, where $L_0$ is inductance in opposition and $I_{phase}$ is current measured at an instant of the transition to opposition.

7. A control method for a vehicle drive assembly, comprising:

applying a conduction angle set point value greater than 180° to a variable reluctance machine to operate the machine in a continuous current mode, the angle being adjusted according to a stability control measurement of operating stability of the machine in the continuous current mode, wherein the stability measurement is a control measurement of torque according to which a difference between a value of a set point torque value and an estimated torque value obtained from an estimation of flux is calculated;

correcting the difference between the set point torque value and the estimated torque value to determine an additional conduction angle; and adding 180° to the additional conduction angle to determine the adjusted conduction angle set point value to apply to the machine.

8. The method as claimed in claim 7, wherein the torque value is estimated, using the flux estimation, by calculating a difference between energy transmitted in a magnetization phase and energy returned in a demagnetization phase.

9. The method as claimed in claim 1, wherein the correcting is performed by a corrector provided with a correction law suitable for modifying the conduction angle set point value applied to the machine so as to make the difference zero.

10. The method as claimed in claim 9, wherein the correction law is of proportional-integral type.

11. The method as claimed in claim 9, wherein the conduction angle set point value calculated from the flux estimation calculated in a preceding electrical period is applied to the machine over an electrical period.

12. The method as claimed in claim 11, wherein the flux estimation value in a first period can be imposed on a predetermined value, the predetermined value being a flux value obtained for a conduction angle of 180°.

13. A drive assembly for a motor vehicle, comprising:
an internal combustion engine;
a variable reluctance machine; and
a control unit,
wherein the control unit is configured to apply to the machine a conduction angle set point value greater than 180° for an operation of the machine in a continuous current mode which is adjusted according to a control measurement of operating stability of the machine in the continuous current mode, the stability control measurement being carried out using an estimation of phase flux, and the stability measurement being a control measurement of the flux according to which a difference between a value of a set point flux and a value of estimated flux is measured,
wherein the control unit is configured to correct the difference between the set point flux and the estimated flux to determine an additional conduction angle, and
wherein the control unit is configured to add 180° to the additional conduction angle to determine the adjusted conduction angle set point value to apply to the machine.

14. A vehicle, comprising:
an assembly as claimed in claim 13.

15. The method as claimed in claim 7, wherein the flux is estimated by integrating a voltage applied to a phase in an electrical period according to $\Phi estimated=\int(U_{phase}-R_{phase}\cdot I_{phase})dt$, where $R_{phase}$ designates resistance of a stator winding, $U_{phase}$ phase voltage, and $I_{phase}$ phase current.

16. The method as claimed in claim 15, wherein a direct measurement of the phase voltage is carried out.

17. The method as claimed in claim 15, wherein a start and end of magnetization control instructions and the phase current are used to determine the phase voltage, the phase voltage being equal to power supply voltage during a magnetization time, to a demagnetization time, and to zero during freewheeling phases or when the phase current is zero.

18. The method as claimed in claim 7, wherein the flux estimation is periodically updated using a measured flux value and the flux estimation is realigned, in each electrical period, at a time of transition to opposition, on value $L_0 \cdot I_{phase}$, where $L_0$ is inductance in opposition and $I_{phase}$ is current measured at an instant of the transition to opposition.

19. A drive assembly for a motor vehicle, comprising:
an internal combustion engine;
a variable reluctance machine; and
a control unit,
wherein the control unit is configured to apply to the machine a conduction angle set point value greater than 180° for an operation of the machine in a continuous current mode which is adjusted according to a control measurement of operating stability of the machine in the continuous current mode, the stability control measurement being carried out using an estimation of torque, and the stability measurement being a control measurement of the torque according to which a difference between a value of a set point torque and a value of estimated torque is measured,
wherein the control unit is configured to correct the difference between the set point torque and the estimated torque to determine an additional conduction angle, and
wherein the control unit is configured to add 180° to the additional conduction angle to determine the adjusted conduction angle set point value to apply to the machine.

* * * * *